United States Patent
Hou et al.

(10) Patent No.: US 11,467,847 B2
(45) Date of Patent: Oct. 11, 2022

(54) RESTART CONTROL DEVICE AND RESTART CONTROL METHOD

(71) Applicants: Ching-Min Hou, Taichung (TW); An-Chi Tsai, Taipei (TW)

(72) Inventors: Ching-Min Hou, Taichung (TW); An-Chi Tsai, Taipei (TW)

(73) Assignee: ITE Tech. Inc., Hsinchu (TW)

( * ) Notice: Subject to any disclaimer, the term of this patent is extended or adjusted under 35 U.S.C. 154(b) by 119 days.

(21) Appl. No.: 16/817,620

(22) Filed: Mar. 13, 2020

(65) Prior Publication Data

US 2021/0208898 A1 Jul. 8, 2021

(30) Foreign Application Priority Data

Jan. 6, 2020 (TW) ................................. 109100304

(51) Int. Cl.
*G06F 9/4401* (2018.01)
*G06F 3/023* (2006.01)
(Continued)

(52) U.S. Cl.
CPC .......... *G06F 9/4401* (2013.01); *G06F 3/0238* (2013.01); *G06F 1/24* (2013.01);
(Continued)

(58) Field of Classification Search
CPC .......... G06F 9/4403; G06F 1/24; G06F 11/30; G06F 11/1441; G06F 9/4401; G06F 3/0238
(Continued)

(56) References Cited

U.S. PATENT DOCUMENTS

| 4,497,021 A | * | 1/1985 | Fukuda ................. G06F 9/4403 712/43 |
| 5,506,990 A | * | 4/1996 | Holman, Jr. ............. G06F 1/24 713/300 |

(Continued)

FOREIGN PATENT DOCUMENTS

| TW | 243505 | 3/1995 |
| TW | 200614045 | 5/2006 |

(Continued)

OTHER PUBLICATIONS

"Office Action of Taiwan Counterpart Application", dated Nov. 5, 2021, pp. 1-6.

(Continued)

*Primary Examiner* — Ji H Bae
(74) *Attorney, Agent, or Firm* — JCIPRNET (57) ABSTRACT

The disclosure provides a restart control device and a restart control method. The restart control device is disposed in an electronic device. The electronic device includes a keyboard and a restart button. At least one assigned key of a plurality of keys of the keyboard is set. The restart control device determines whether the at least one assigned key is pressed, and determines whether the restart button is pressed. When determining that the restart button is pressed and the at least one assigned key is pressed, the restart control device provides a restart control signal to cause the electronic device to perform a restart operation. The disclosure can prevent an unnecessary restart operation due to a single restart button being mistyped.

13 Claims, 6 Drawing Sheets

(51) Int. Cl.
  *G06F 11/14* (2006.01)
  *G06F 1/24* (2006.01)
  *G06F 11/30* (2006.01)

(52) U.S. Cl.
  CPC ........ *G06F 9/4403* (2013.01); *G06F 11/1441* (2013.01); *G06F 11/30* (2013.01)

(58) Field of Classification Search
  USPC ..................................... 713/1, 2; 710/18, 67
  See application file for complete search history.

(56) References Cited

U.S. PATENT DOCUMENTS

| | | | | |
|---|---|---|---|---|
| 5,850,546 | A * | 12/1998 | Kim | G06F 1/24 713/1 |
| 6,079,016 | A * | 6/2000 | Park | G06F 9/441 713/2 |
| 6,625,739 | B1 * | 9/2003 | Kobayashi | G06F 1/26 341/22 |
| 6,724,399 | B1 | 4/2004 | Katchour et al. | |
| 8,311,575 | B2 * | 11/2012 | Li | G06F 1/24 455/550.1 |
| 2001/0049783 | A1 * | 12/2001 | Chen | G06F 1/24 713/1 |
| 2003/0182547 | A1 * | 9/2003 | Kumagai | G06F 3/0647 713/2 |
| 2005/0050232 | A1 * | 3/2005 | Yoshioka | G06F 3/023 710/1 |
| 2008/0120437 | A1 | 5/2008 | Butterfield | |
| 2012/0225727 | A1 | 9/2012 | Mori | |
| 2013/0145140 | A1 * | 6/2013 | Hsien | G06F 21/575 713/2 |
| 2014/0115311 | A1 * | 4/2014 | Wang | G06F 9/4403 713/2 |
| 2016/0062487 | A1 | 3/2016 | Foss et al. | |
| 2019/0354377 | A1 * | 11/2019 | Tan | G06F 9/441 |

FOREIGN PATENT DOCUMENTS

| | | |
|---|---|---|
| TW | I446151 | 7/2014 |
| TW | I454894 | 10/2014 |

OTHER PUBLICATIONS

"Office Action of China Counterpart Application", dated Jul. 26, 2022, p. 1-p. 10.

\* cited by examiner

FIG. 6 or a notebook computer) has a restart button. By pressing the restart button, a user may cause the electronic device to perform a restart operation. The restart operation is an operation such as resetting a system setting of the electronic device, restarting the electronic device, or turning off the electronic device. However, while the electronic device is operating, the electronic device may perform an unnecessary restart operation because the restart button is accidentally mistyped (or pressed by mistake) by the user. Therefore, a restart mechanism for preventing the restart button from being mistyped is needed.

RESTART CONTROL DEVICE AND RESTART CONTROL METHOD

CROSS-REFERENCE TO RELATED APPLICATION

This application claims the priority benefit of Taiwan application serial no. 109100304, filed on Jan. 6, 2020. The entirety of the above-mentioned patent application is hereby incorporated by reference herein and made a part of this specification.

BACKGROUND

Technical Field

The disclosure relates to a control device and a control method, and in particular, to a restart control device and a restart control method.

Description of Related Art

An electronic device (such as a desktop computer or a notebook computer) has a restart button. By pressing the restart button, a user may cause the electronic device to perform a restart operation. The restart operation is an operation such as resetting a system setting of the electronic device, restarting the electronic device, or turning off the electronic device. However, while the electronic device is operating, the electronic device may perform an unnecessary restart operation because the restart button is accidentally mistyped (or pressed by mistake) by the user. Therefore, a restart mechanism for preventing the restart button from being mistyped is needed.

SUMMARY

The disclosure provides a restart control device and a restart control method, to prevent an unnecessary restart operation due to a single restart button being mistyped, and avoid a case in which a restart operation cannot be performed due to a firmware crash.

The restart control device in the disclosure is disposed in an electronic device. The electronic device includes a keyboard and a restart button. The keyboard includes a plurality of keys. At least one assigned key of the keys is set. The restart control device includes a keyboard scan part and a determining part. The keyboard scan part is coupled to the keyboard. The keyboard scan part is configured to perform a scan operation on the keys to generate a scan result. The determining part is coupled to the restart button and the keyboard scan part. The determining part is configured to: receive the scan result, determine, according to the scan result, whether the at least one assigned key is pressed, and determine whether the restart button is pressed. The determining part provides a restart control signal when determining that the restart button is pressed and the at least one assigned key is pressed. The electronic device performs a restart operation according to the restart control signal.

The restart control method in the disclosure is adapted for an electronic device. The electronic device includes a keyboard and a restart button. The keyboard includes a plurality of keys. The restart control method includes: setting at least one assigned key of the keys; performing a scan operation on the keys to generate a scan result; determining, according to the scan result, whether the at least one assigned key is pressed, and determining whether the restart button is pressed; and providing a restart control signal when determining that the restart button is pressed and the at least one assigned key is pressed. The electronic device performs a restart operation according to the restart control signal.

Based on the foregoing, according to the restart control device and the restart control method in the disclosure, whether the at least one assigned key is pressed is determined, and whether the restart button is pressed is determined. The restart control signal causing the electronic device to perform the restart operation is provided when it is determined that the restart button is pressed and the at least one assigned key is pressed. In this way, the disclosure can prevent an unnecessary restart operation due to a single restart button being mistyped (or pressed by mistake).

To make the features and advantages of the disclosure clear and easy to understand, the following gives a detailed description of embodiments with reference to accompanying drawings.

DESCRIPTION OF THE EMBODIMENTS

Figure 1:
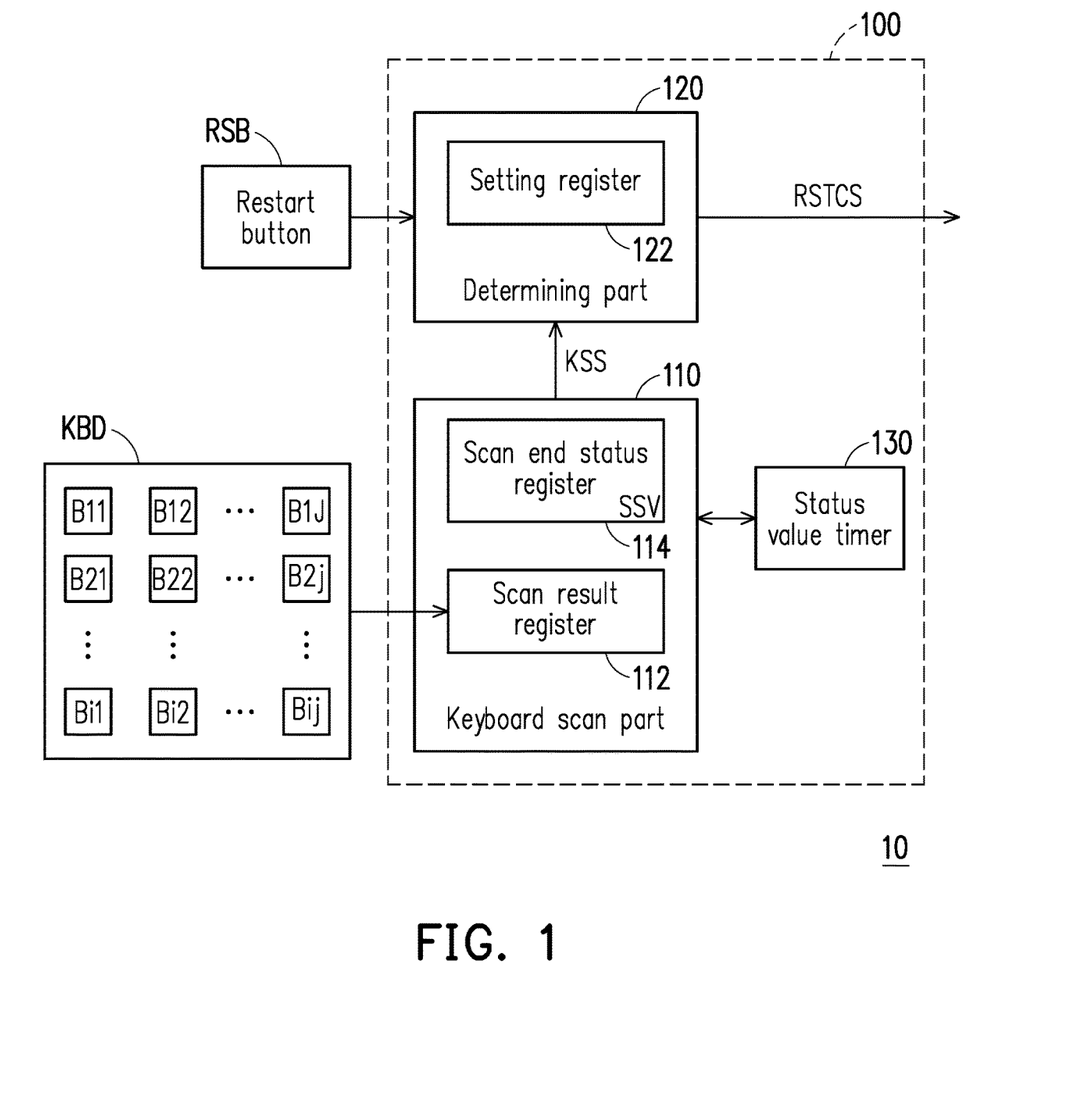
FIG. 1 is a schematic device diagram of a restart control device according to a first embodiment of the disclosure.

Referring to FIG. 1, FIG. 1 is a schematic device diagram of a restart control device according to a first embodiment of the disclosure. In the present embodiment, the restart control device 100 is disposed in an electronic device 10. The electronic device 10 may be a device such as a desktop computer or a notebook computer. The electronic device 10 includes at least a keyboard KBD and a restart button RSB. The keyboard KBD includes keys B11 to Bij. In the present embodiment, at least one assigned key of the keys B11 to Bij is set. For example, a key B11 of the keys B11 to Bij may be set to an assigned key. For another example, keys B11 and B22 of the keys B11 to Bij may be set to assigned keys. In other words, a quantity of assigned keys may be set according to a use requirement. In the present embodiment, the keyboard KBD may be a keyboard such as a capacitive keyboard, a resistive keyboard, or an optical keyboard. A form of the keyboard KBD and a quantity of and an arrangement manner of the keys B11 to Bij are not limited in the disclosure. In the present embodiment, the restart button RSB is a button participating in operations such as resetting a system setting of the electronic device 10, restarting the electronic device 10, or turning off the electronic device 10. One or more assigned keys may be set in the disclosure. This is not limited in the present embodiment.

In the present embodiment, the restart control device 100 includes a keyboard scan part 110 and a determining part 120. The keyboard scan part 110 is coupled to the keyboard KBD. The keyboard scan part 110 performs a scan operation on the keys B11 to Bij to generate a scan result KSS. In the present embodiment, the keyboard scan part 110 may include a scan result register 112. The scan result register 112 stores the scan result KSS generated through the scan operation.

In the present embodiment, the determining part 120 is coupled to the restart button RSB and the keyboard scan part 110. The determining part 120 receives the scan result KSS, and determines, according to the scan result KSS, whether the assigned key of the keyboard is pressed. The determining part 120 further determines whether the restart button RSB is pressed. The determining part 120 provides a restart control signal RSTCS when determining that the restart button RSB is pressed and the assigned key is pressed. The electronic device 10 performs a restart operation according to the restart control signal RSTCS.

For example, the determining part 120 includes a setting register 122. The setting register 122 stores setting information associated with the assigned key. The setting information may be set by a user or set before delivery. The setting information is information recording that the keys B11 and B22 are set to the assigned keys. After receiving the scan result KSS, the determining part 120 compares the scan result KSS with the setting information, to determine whether the assigned keys (that is, the keys B11 and B22) are pressed, and determines whether the restart button RSB is pressed. If a comparison result is that the scan result KSS and the setting information are the same, it indicates that the scan result KSS received by the determining part 120 is an operation result in which only the keys B11 and B22 are pressed. Therefore, the determining part 120 determines that the keys B11 and B22 (the assigned keys) are pressed. The determining part 120 provides the restart control signal RSTCS when determining that the keys B11 and B22 (the assigned keys) and the restart button RSB are pressed. The determining part 120 does not provide the restart control signal RSTCS when determining that the keys B11 and B22 and the restart button RSB are not pressed at the same time. In some embodiments, the determining part 120 also does not provide the restart control signal RSTCS when determining that a key except the keys B11 and B22 is pressed.

It should be noted herein that the restart control device 100 determines whether the assigned keys of the keyboard KBD are pressed, and determines whether the restart button RSB is pressed. When determining that the restart button RSB is pressed and the assigned keys are pressed, the determining part 120 provides the restart control signal RSTCS causing the electronic device 10 to perform the restart operation. In this way, the disclosure can prevent an unnecessary restart operation due to the restart button RSB being mistyped (or pressed by mistake).

In the present embodiment, the keyboard scan part 110 and the determining part 120 include, for example, a central processing unit (CPU), a microprocessor, a digital signal processor (DSP), a programmable controller, a programmable logic device (PLD), or other similar devices or a combination of these devices. This is not limited in the disclosure.

Further, in the present embodiment, the keyboard scan part 110 further includes a scan end status register 114. The scan end status register 114 stores a scan end status value SSV. The scan end status register 114 changes the scan end status value SSV when the scan operation ends. In the present embodiment, the scan end status register 114 changes the scan end status value SSV from a first value to a second value when the scan operation ends. The first value is an initial value after the electronic device 10 completes the restart operation. The first value is different from the second value. In the present embodiment, the keyboard scan part 110 performs the scan operation according to the scan end status value SSV including the first value. On the other hand, the keyboard scan part 110 does not perform the scan operation according to the scan end status value SSV including the second value. In the present embodiment, the scan end status value SSV may be, for example, a flag value having at least one bit.

In the present embodiment, the restart control device 100 further includes a status value timer 130. The status value timer 130 is coupled to the keyboard scan part 110. The status value timer 130 times a time duration for which the scan end status value SSV is maintained as the second value, and determines whether to change the scan end status value SSV from the second value to the first value, so as to recover the scan end status value SSV. For example, the status value timer 130 determines whether the time duration for which the scan end status value SSV is maintained as the second value is greater than or equal to a preset status time duration. When the status value timer 130 determines that the time duration for which the scan end status value SSV is maintained as the second value is greater than or equal to the preset status time duration, it indicates that the time duration for which the scan end status value SSV is maintained as the second value has reached the preset status time duration. Therefore, the status value timer 130 instructs the keyboard scan part 110 to change the scan end status value SSV from the second value to the first value. In other words, when the time duration for which the scan end status value SSV is maintained as the second value is greater than or equal to the preset status time duration, the scan end status value SSV is recovered, and the keyboard scan part 110 may perform the scan operation.

Generally, the electronic device 10 may recover the scan end status value SSV by using an interrupt instruction provided by firmware, so as to perform the scan operation on the keyboard. However, when the time duration for which the scan end status value SSV is maintained as the second value is excessively long, it indicates that the firmware of the electronic device 10 crashes and the scan end status value SSV cannot be recovered. The status value timer 130 in the present embodiment instructs the keyboard scan part 110 to recover the scan end status value SSV, so as to avoid a case in which the scan end status value SSV cannot be recovered due to a firmware crash.

On the other hand, when the status value timer 130 determines that the time duration for which the scan end status value SSV is maintained as the second value is less than the preset status time duration, it indicates that the time duration for which the scan end status value SSV is maintained as the second value does not reach the preset status time duration. The scan end status value SSV is maintained as the second value. Therefore, the keyboard scan part 110 does not perform the scan operation.

In the present embodiment, the preset status time duration may be set according to a use requirement. The preset status time duration may be set to 7.5 to 35 seconds. The disclosure is not limited to the present embodiment.

In some embodiments, the status value timer 130 may be implemented by using a counter. The status value timer 130 may be enabled after the scan operation ends and receive a clock. The status value timer 130 counts a quantity of occurrences of rising edges, falling edges, or positive pulses in the clock, and calculates, according to a counting result and a clock cycle, the time duration for which the scan end status value SSV is maintained as the second value.

It should be noted herein that the restart control device 100 can recover the scan end status value SSV, and cause, according to the recovery of the scan end status value SSV, the keyboard scan part 110 to perform the scan operation. In this way, the disclosure can avoid a case in which the restart operation cannot be performed due to the firmware crash.

Figure 2:
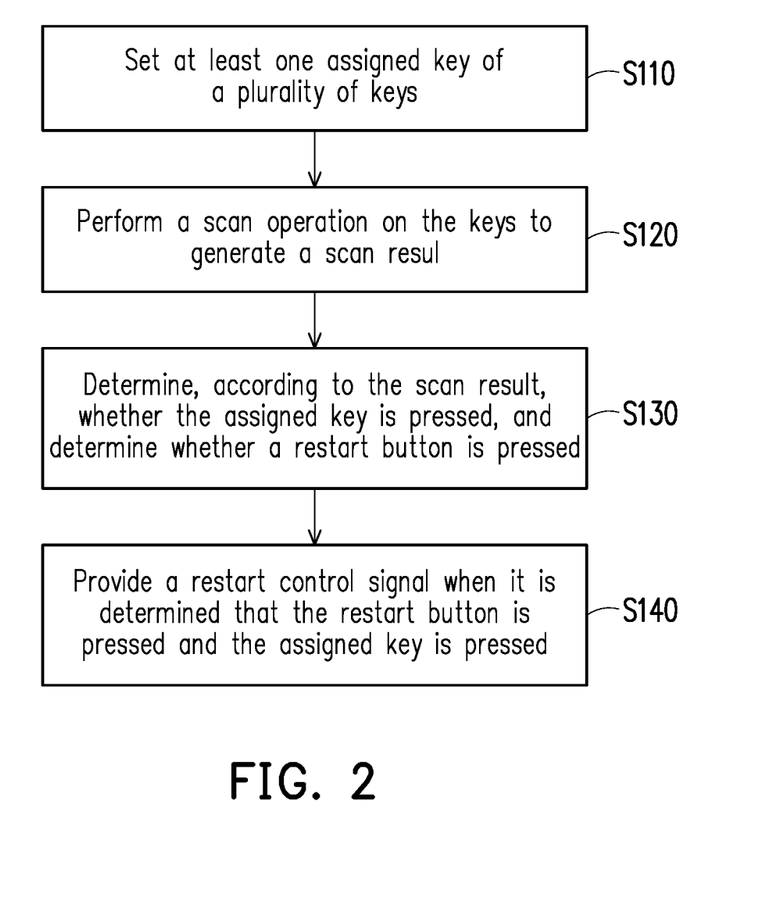
FIG. 2 is a first method flowchart of a restart control method according to an embodiment of the disclosure.

Referring to both FIG. 1 and FIG. 2, FIG. 2 is a first method flowchart of a restart control method according to an embodiment of the disclosure. In the present embodiment, the restart control method is applied to the electronic device 10. Step S110. Set at least one of keys B11 to Bij of a keyboard KBD to an assigned key. Step S120. Perform a scan operation on the keys B11 to Bij to generate a scan result KSS. Step S130. Determine, according to the scan result KSS, whether the assigned key is pressed, and determine whether a restart button RSB is pressed. Step S140. Provide a restart control signal RSTCS when it is determined that the restart button RSB is pressed and the assigned key is pressed. Implementation details of steps S110 to S140 in the present embodiment may be sufficiently obtained from the embodiment of FIG. 1. Therefore, the descriptions thereof are omitted herein.

Figure 3:
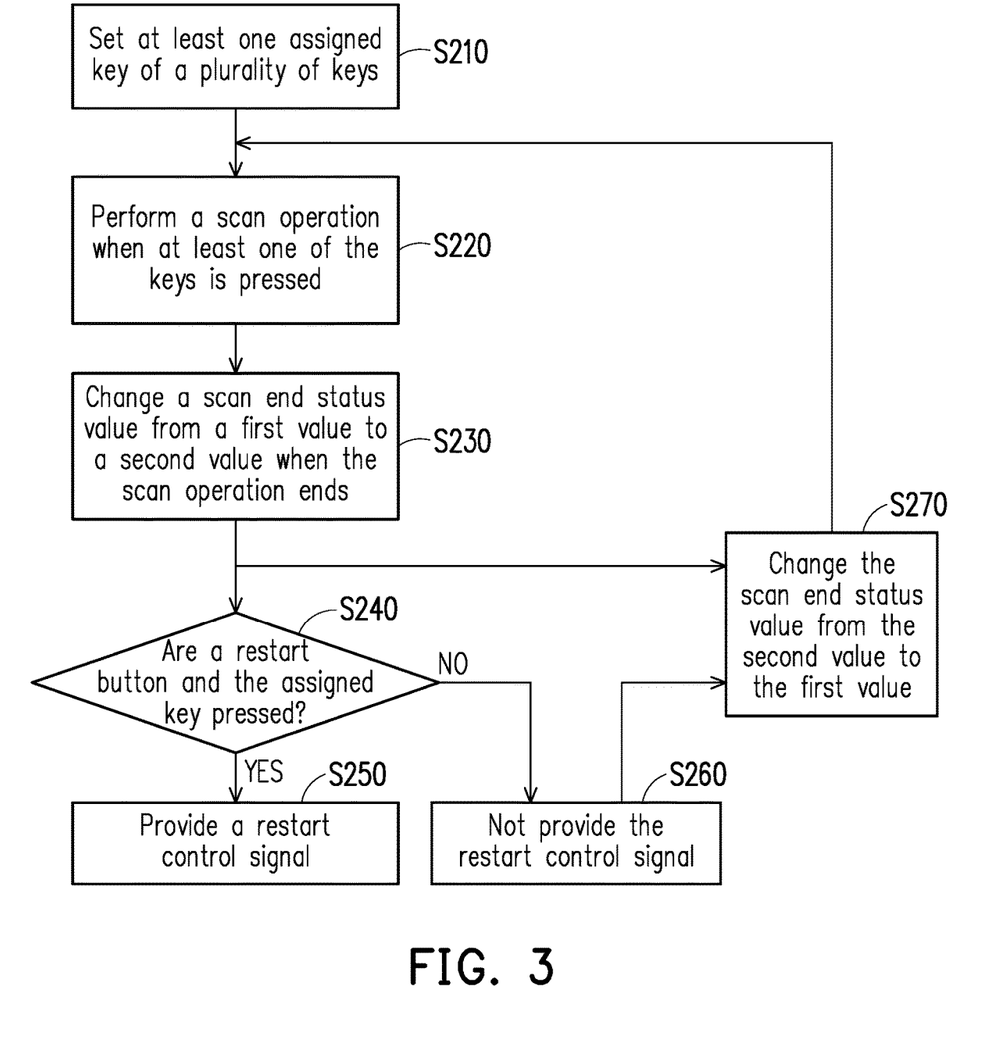
FIG. 3 is a second method flowchart of a restart control method according to an embodiment of the disclosure.

Referring to both FIG. 1 and FIG. 3, FIG. 3 is a second method flowchart of a restart control method according to an embodiment of the disclosure. The restart control method in the present embodiment may be applied to the electronic device 10. Step S210. Set at least one of keys B11 to Bij of a keyboard KBD to an assigned key. Step S220. Start to perform a scan operation on the keys B11 to Bij. In the present embodiment, when the at least one of the keys B11 to Bij is pressed, the keyboard scan part 110 starts to perform the scan operation. Step S230. The keyboard scan part 110 changes a scan end status value SSV from a first value to a second value when the scan operation ends. The keyboard scan part 110 does not perform the scan operation according to the scan end status value SSV including the second value. Step S240. The determining part 120 determines whether a restart button RSB and the assigned key of the keyboard KBD are pressed. When the determining part 120 determines that the restart button RSB and the assigned key are pressed, the restart control method proceeds to step S250. Step S250. The determining part 120 provides a restart control signal RSTCS.

For example, for implementation details of steps S240 and S250, the determining part 120 includes a setting register 122. The setting register 122 stores setting information associated with the assigned key. The setting information is information recording that keys B11 and B22 are set to assigned keys. The determining part 120 compares a scan result KSS with the setting information to determine whether the assigned keys (that is, the keys B11 and B22) are pressed in step S240, and determines whether the restart button RSB is pressed in step S240. In step S240, the determining part 120 provides the restart control signal RSTCS in step S250 when determining that the keys B11 and B22 (that is, the assigned keys) and the restart button RSB are pressed.

Back to step S240, when the determining part 120 determines that one of the restart button RSB and the assigned keys is pressed or neither is pressed, the restart control method proceeds to step S260. In some embodiments, when it is determined that a key except the keys B11 and B22 is pressed, the restart control method also proceeds to step S260. Step S260. The determining part 120 does not provide the restart control signal RSTCS, and the restart control method proceeds to step S270.

Step S270. The keyboard scan part 110 changes the scan end status value SSV from the second value to the first value. For example, a status value timer 130 determines whether a time duration for which the scan end status value SSV is maintained as the second value is greater than or equal to a preset status time duration. When the status value timer 130 determines that the time duration for which the scan end status value SSV is maintained as the second value does not reach the preset status time duration, the scan end status value SSV is maintained as the second value. Therefore, the keyboard scan part 110 does not perform the scan operation. When determining that the time duration for which the scan end status value SSV is maintained as the second value reaches the preset status time duration, the status value timer 130 instructs the keyboard scan part 110 to change the scan end status value SSV from the second value to the first value. In other words, when the time duration for which the scan end status value SSV is maintained as the second value is greater than or equal to the preset status time duration, the scan end status value SSV is recovered, and the keyboard scan part 110 may perform the scan operation. Next, the restart control method goes back to step S220. In the present embodiment, step S270 may be performed at any moment after step S230.

Figure 4:
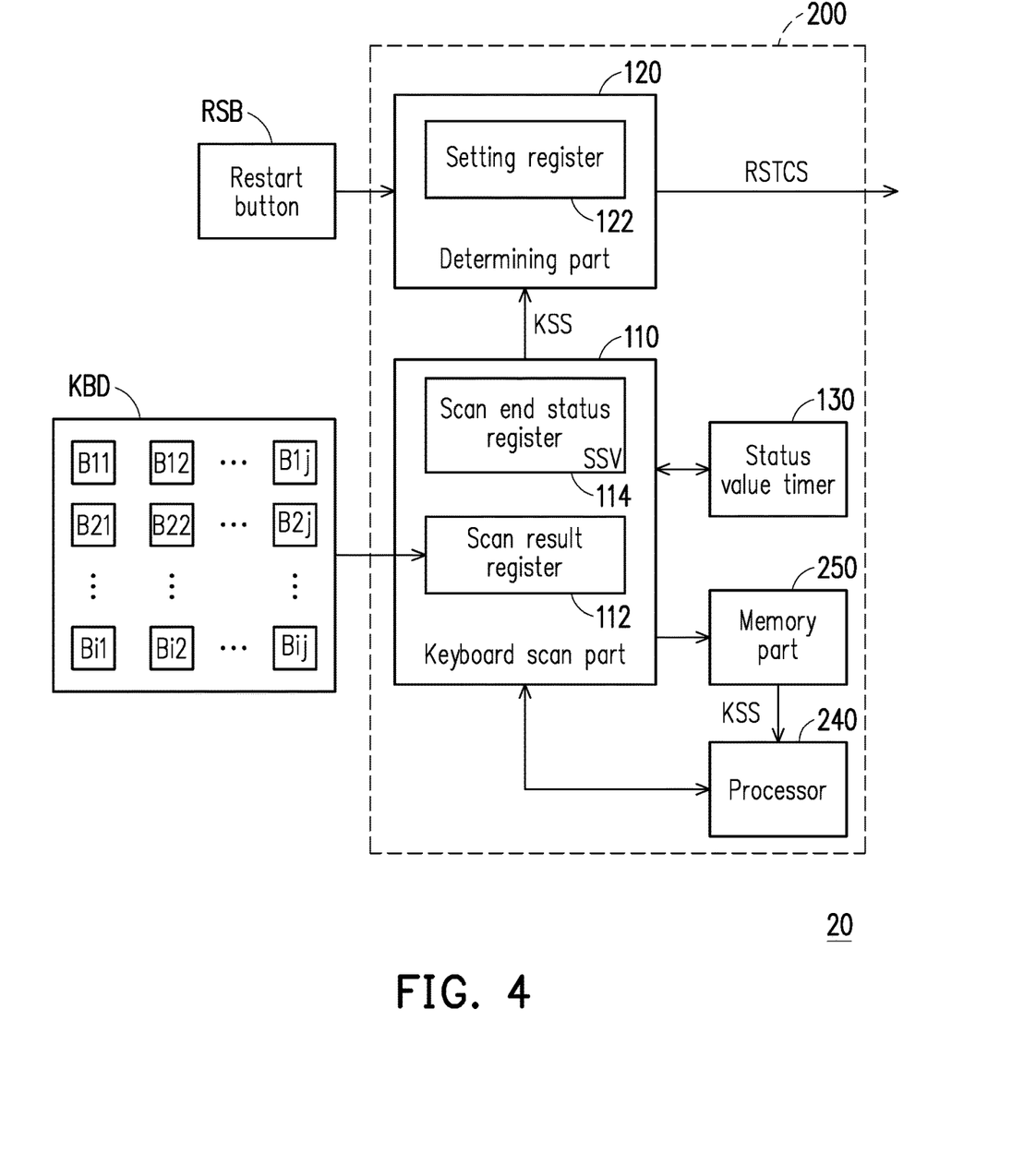
FIG. 4 is a schematic device diagram of a restart control device according to a second embodiment of the disclosure.

To further describe other implementations of step S270, referring to both FIG. 3 and FIG. 4, FIG. 4 is a schematic device diagram of a restart control device according to a second embodiment of the disclosure. In the present embodiment, the restart control device 200 may be disposed in an electronic device 20. In the present embodiment, different from the restart control device 100, the restart control device 200 further includes a processor 240. In the present embodiment, the processor 240 is coupled to a keyboard scan part 110. The processor 240 checks a scan end status value SSV at every preset time duration. The processor 240 instructs the keyboard scan part 110 to change the scan end status value SSV from a second value to a first value when checking and finding that the scan end status value SSV is changed from the first value to the second value in step S270 (that is, after step S230). In other words, the restart control device 200 may check, in a polling manner, whether the scan end status value SSV needs to be recovered. In the present embodiment, the processor 240 includes, for example, a CPU, a microprocessor, a DSP, a programmable controller, a PLD, or other similar devices or a combination of these devices. This is not limited in the disclosure.

In some embodiments, the restart control device 200 may use the processor 240 to read a scan result KSS stored in a scan result register 112 after step S230 and provide the scan result KSS to a determining part 120. In other words, the processor 240 may provide another path for transmitting the scan result KSS.

In the present embodiment, the restart control device 200 further includes a memory part 250. During a scan operation (step S220), in a first time interval, the keyboard scan part 110 stores a first-row (column) key scan result of the scan result KSS to the scan result register 112. The scan result register 112 provides the first-row (column) key scan result to the memory part 250. In a second time interval, the keyboard scan part 110 stores a second-row (column) key scan result of the scan result KSS to the scan result register 112. The scan result register 112 provides the second-row (column) key scan result to the memory part 250, and so on, until the scan operation ends (step S230). Therefore, the memory part 250 stores the entire scan result KSS when the scan operation ends. The processor 240 can read the scan result KSS stored in the memory part 250 and provide the scan result KSS to the determining part 120. In the present embodiment, the scan result KSS provided by the processor 240 may be provided to the determining part 120 by using the keyboard scan part 110. In some embodiments, the processor 240 is further coupled to the determining part 120. The scan result KSS provided by the processor 240 is provided to the determining part 120.

In the present embodiment, the memory part 250 may be implemented by using a static random access memory (SRAM). In some embodiments, the memory part 250 may be any type of fixed or removable random access memory (RAM), a read-only memory (ROM), a flash memory, or a similar element or a combination of the foregoing elements.

Figure 5:
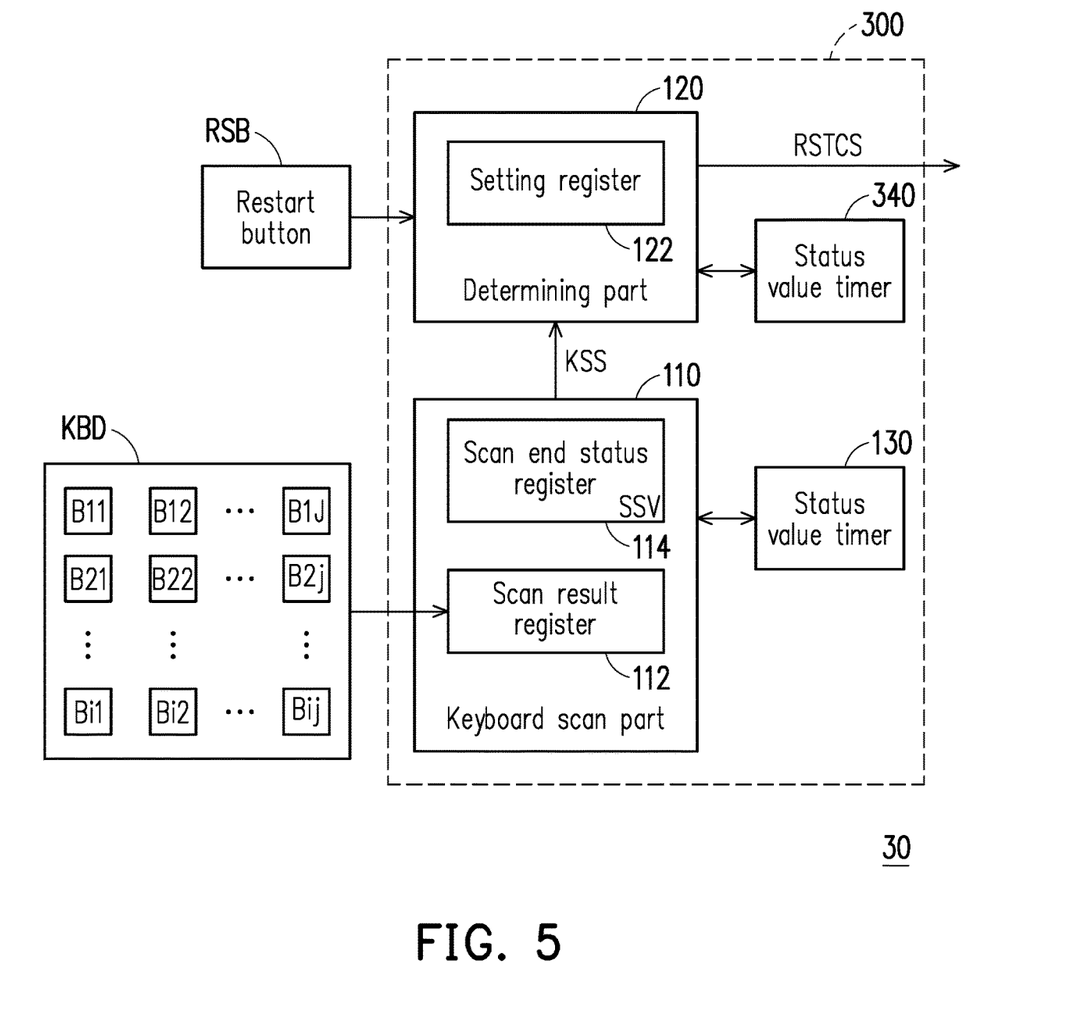
FIG. 5 is a schematic device diagram of a restart control device according to a third embodiment of the disclosure.
Figure 6:
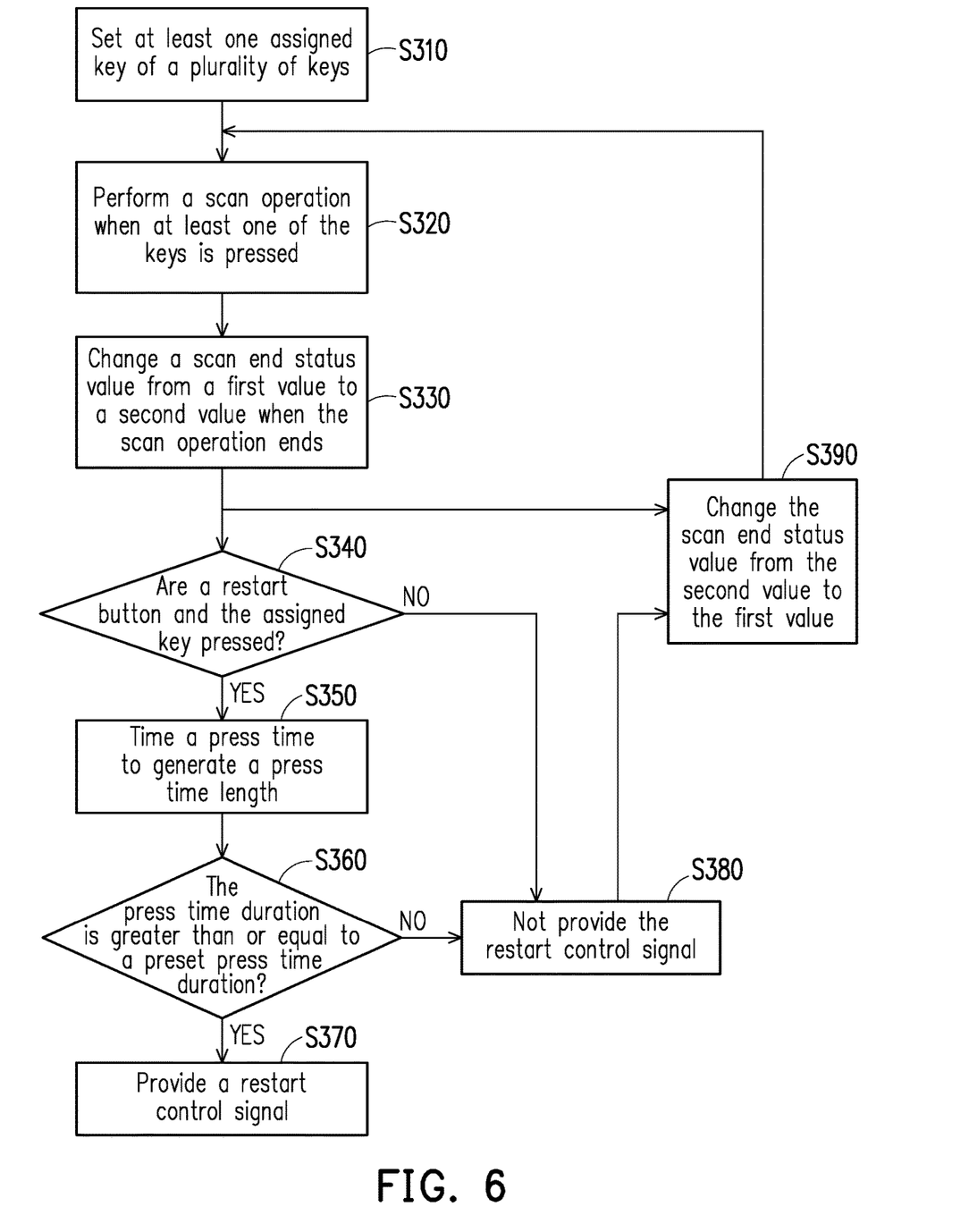
FIG. 6 is a third method flowchart of a restart control method according to an embodiment of the disclosure.

Referring to both FIG. 5 and FIG. 6, FIG. 5 is a schematic device diagram of a restart control device according to a third embodiment of the disclosure. FIG. 6 is a third method flowchart of a restart control method according to an embodiment of the disclosure. In the present embodiment, different from the restart control device 100, the restart control device 300 further includes a press timer 340. In the present embodiment, the press timer 340 is coupled to a determining part 120. The press timer 340 times a time duration for which a restart button RSB is pressed and assigned keys are pressed, to generate a press time duration.

Specifically, the press time duration is a maintaining time duration for which the restart button RSB is pressed and the assigned keys are pressed. When the restart button RSB is pressed and the assigned keys are pressed, the press timer 340 starts timing. When the restart button RSB is pressed and at least one of the assigned keys is not pressed, the press timer 340 stops timing, to generate the press time duration, and provides the press time duration to the determining part 120. When a timed time duration is equal to a preset press time duration, the press timer 340 uses the time duration at this moment as the press time duration, and provides the press time duration to the determining part 120.

In some embodiments, the press timer 340 may be implemented by using a counter. The press timer 340 may be enabled when the restart button RSB is pressed and the assigned keys are pressed and receive a clock. The press timer 340 counts a quantity of occurrences of rising edges, falling edges, or positive pulses in the clock, and generates the press time duration according to a counting result and a clock cycle.

In the present embodiment, implementation content of steps S310 to S330 may be sufficiently obtained from the embodiments of FIG. 1 to FIG. 4. Therefore, the descriptions thereof are omitted herein. Step S340. The determining part 120 determines whether a restart button RSB and assigned keys of a keyboard KBD are pressed. When the determining part 120 determines that the restart button RSB and the assigned keys are pressed, the restart control method proceeds to step S350. When proceeding to step S350, the press timer 340 starts counting a press time. Step S360. The determining part 120 determines whether a press time duration is greater than or equal to a preset press time duration of setting information. When the determining part 120 determines that the press time duration is greater than or equal to the preset press time duration of the setting information, the restart control method proceeds to step S370. Step S370. The determining part 120 provides a restart control signal RSTCS.

In the present embodiment, the preset press time duration may be set according to a use requirement. The preset press time duration may be set to 5 to 10 milliseconds. The disclosure is not limited to the present embodiment.

Back to step S360, when the determining part 120 determines that one of the restart button RSB and the assigned keys is pressed or neither is pressed, the restart control method proceeds to step S380. Step S380. The determining part 120 does not provide the restart control signal RSTCS, and the restart control method proceeds to step S390. Step S390. A keyboard scan part 110 changes a scan end status value SSV from a second value to a first value. Next, the restart control method goes back to step S320. Implementation details of step S390 may be sufficiently obtained from the implementation content of step S270. Therefore, the descriptions thereof are omitted herein.

Back to step S340, when the determining part 120 determines that one of the restart button RSB and the assigned keys is pressed or neither is pressed, the restart control method proceeds to step S380. Step S380. The determining part 120 does not provide the restart control signal RSTCS, and the restart control method proceeds to step S390. The keyboard scan part 110 changes the scan end status value SSV from the second value to the first value. Next, the restart control method goes back to step S320.

It should be noted herein that the restart control device 300 determines, according to the press time duration for which the assigned keys and the restart button RSB are pressed, whether to provide the restart control signal RSTCS. In this way, the disclosure can prevent an unnecessary restart operation due to a single restart button RSB being mistyped (or pressed by mistake).

Based on the foregoing, according to the restart control device and the restart control method in the disclosure, whether at least one assigned key is pressed is determined, and whether the restart button is pressed is determined. The restart control signal causing the electronic device to perform the restart operation is provided when it is determined that the restart button is pressed and the at least one assigned key is pressed. In this way, the disclosure can prevent an unnecessary restart operation due to a single restart button being mistyped (or pressed by mistake). In addition, the restart control device can recover the scan end status value, and cause, according to the recovery of the scan end status value, the keyboard scan part to perform the scan operation. In this way, the disclosure can avoid a case in which the restart operation cannot be performed due to a firmware crash.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A restart control device, disposed in an electronic device, wherein the electronic device comprises a keyboard and a restart button, the keyboard comprises a plurality of keys, at least one assigned key of the keys is set, and the restart control device comprises:
    a keyboard scan controller, coupled to the keyboard, comprising:
        a first processing circuit, configured to perform a scan operation on the keys to generate a scan result; and
        a scan end status register, coupled to first processing circuit, wherein a scan end status value from a first value to a second value in the scan end status register is changed when the scan operation ends, wherein the first processing circuit does not perform the scan operation according to the scan end status value having the second value, wherein during a period when the scan end status value is the second value, the electronic device recovers the scan end status value to the first value by using an interrupt instruction and/or the restart control device checks whether the scan end status value needs to be recovered in a polling manner a determining controller, coupled to the restart button and the keyboard scan controller, comprising:
  a second processing circuit, configured to receive the scan result, determine, according to the scan result, whether the at least one assigned key is pressed, determine whether the restart button is pressed, and provide a restart control signal when determining that the restart button is pressed and the at least one assigned key is pressed; and
a status value timer, coupled to the first processing circuit, and configured to time a time duration for which the scan end status value is maintained as the second value, and instruct the first processing circuit to change the scan end status value from the second value to the first value when the status value timer determines that the time duration for which the scan end status value is maintained as the second value is greater than or equal to a preset status time duration,
wherein the preset status time duration is associated to a time duration during which the electronic device cannot recover the scan end status value to the first value,
wherein the electronic device performs a restart operation according to the restart control signal.

2. The restart control device according to claim 1, wherein the first processing circuit performs the scan operation when at least one of the keys is pressed.

3. The restart control device according to claim 1, wherein the keyboard scan controller further comprises:
  a scan result register, coupled to the first processing circuit, configured to store the scan result.

4. The restart control device according to claim 1, further comprising:
  a processor, coupled to the keyboard scan controller, and configured to: check the scan end status value at every preset time duration, and instruct the first processing circuit to change the scan end status value from the second value to the first value when checking and finding that the scan end status value is changed from the first value to the second value.

5. The restart control device according to claim 1, wherein the determining controller further comprises:
  a setting register, coupled to the second processing circuit, configured to store setting information associated with the at least one assigned key, wherein
  the second processing circuit is further configured to compare the scan result with the setting information to determine whether the at least one assigned key is pressed.

6. The restart control device according to claim 5, further comprising:
  a press timer, coupled to the determining controller, and configured to: time a time duration for which the restart button is pressed and the at least one assigned key is pressed to generate a press time duration, and provide the press time duration to the second processing circuit.

7. The restart control device according to claim 6, wherein the setting information comprises a preset press time duration, wherein
  the second processing circuit provides the restart control signal when determining that the press time duration is greater than or equal to the preset press time duration.

8. A restart control method, adapted for an electronic device, wherein the electronic device comprises a keyboard and a restart button, the keyboard comprises a plurality of keys, and the restart control method comprises:
  setting at least one assigned key of the keys;
  performing a scan operation on the keys to generate a scan result;
  determining, according to the scan result, whether the at least one assigned key is pressed, and determining whether the restart button is pressed; and
  providing a restart control signal when determining that the restart button is pressed and the at least one assigned key is pressed, wherein
  the electronic device performs a restart operation according to the restart control signal,
wherein performing the scan operation on the keys to generate the scan result further comprises:
  changing a scan end status value from a first value to a second value when the scan operation ends;
  not performing the scan operation, according to the scan end status value comprising the second value, wherein during a period when the scan end status value is the second value, the electronic device recovers the scan end status value to the first value by using an interrupt instruction and/or a restart control device of the electronic device checks whether the scan end status value needs to be recovered in a polling manner;
  timing a time duration for which the scan end status value is maintained as the second value, and
  changing the scan end status value from the second value to the first value when the time duration for which the scan end status value is maintained as the second value is determined as being greater than or equal to a preset status time duration, wherein the preset status time duration is associated to a time duration during which the electronic device cannot recover the scan end status value to the first value.

9. The restart control method according to claim 8, wherein performing the scan operation on the keys to generate the scan result comprises:
  performing the scan operation when at least one of the keys is pressed.

10. The restart control method according to claim 8, wherein performing the scan operation on the keys to generate the scan result further comprises:
  checking the scan end status value at every preset time duration, and changing the scan end status value from the second value to the first value when checking and finding that the scan end status value is changed from the first value to the second value.

11. The restart control method according to claim 8, wherein determining, according to the scan result, whether the at least one assigned key is pressed, and determining whether the restart button is pressed comprises:
  comparing the scan result with setting information associated with the at least one assigned key to determine whether the at least one assigned key is pressed.

12. The restart control method according to claim 11, wherein determining, according to the scan result, whether the at least one assigned key is pressed, and determining whether the restart button is pressed further comprises:
  timing a time duration for which the restart button is pressed and the at least one assigned key is pressed to generate a press time duration.

13. The restart control method according to claim 12, wherein providing the restart control signal when determining that the restart button is pressed and the at least one assigned key is pressed comprises:

providing the restart control signal when the press time duration is determined as being greater than or equal to a preset press time duration of the setting information.

\* \* \* \* \*